US009020024B1

(12) United States Patent
Chaahoub et al.

(10) Patent No.: US 9,020,024 B1
(45) Date of Patent: Apr. 28, 2015

(54) RATE-ADAPTIVE EQUALIZER THAT AUTOMATICALLY INITIALIZES ITSELF BASED ON DETECTED CHANNEL CONDITIONS, AND A METHOD

(71) Applicant: Avago Technologies General IP (Singapore) Pte. Ltd., Singapore (SG)

(72) Inventors: Faouzi Chaahoub, San Jose, CA (US); Georgios Asmanis, Lake Forest, CA (US); Sriramkumar Sundararaman, Belmont, CA (US); Samir Aboulhouda, Cupertino, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/069,338

(22) Filed: Oct. 31, 2013

(51) Int. Cl.
H03H 7/30 (2006.01)
H04L 25/03 (2006.01)

(52) U.S. Cl.
CPC ................. H04L 25/03885 (2013.01)

(58) Field of Classification Search
CPC .......... H04L 25/03057; H04L 25/03885; H04L 27/01; H04B 1/0475; H04B 10/6971; H04B 3/145
USPC .................. 375/233, 229, 232, 230
See application file for complete search history.

(56) References Cited

U.S. PATENT DOCUMENTS

| | | | |
|---|---|---|---|
| 5,252,932 A * | 10/1993 | Someya et al. | 333/18 |
| 7,570,889 B2 | 8/2009 | Shastri et al. | |
| 8,164,499 B1 * | 4/2012 | Booth et al. | 341/135 |
| 8,401,064 B1 * | 3/2013 | Lin et al. | 375/233 |
| 8,407,511 B2 * | 3/2013 | Mobin et al. | 713/500 |
| 2005/0052255 A1 * | 3/2005 | Chiang | 333/18 |
| 2007/0133671 A1 * | 6/2007 | Tsai | 375/233 |
| 2010/0238993 A1 * | 9/2010 | Huang et al. | 375/233 |
| 2012/0170621 A1 * | 7/2012 | Tracy et al. | 375/219 |

FOREIGN PATENT DOCUMENTS

EP  1748611 B1  4/2013

OTHER PUBLICATIONS

Vishnu Balan, Joe Caroselli, Jenn-Gang Chern, Catherine Chow, Ratnakar Dadi, Chintan Desai, Leo Fang, David Hsu, Pankaj Josh, Hiroshi Kimura, Cathy Ye Liu, Tzu-Wang Pan, Ryan Park, Cindy You, Yi Zeng, Eric Zhang, Freeman Zhong, A 4.8-6.4-Gb/s Serial Link for Backplane Applications Using Decision Feedback Equalization, IEEE Journal of Solid-State Circuits, Sep. 2005, p. 1957-1967, vol. 40 No. 9, IEEE, United States.

Garima Malik, Amandeep Singh Sappal, Adaptive Equalization Algorithms: An Overview, International Journal of Advanced Computer Science and Applications (IJACSA), Mar. 2011, p. 62-67, vol. 2 No. 3, IJACSA, United States.

* cited by examiner

*Primary Examiner* — Kenneth Lam

(57) ABSTRACT

A rate-adaptive equalizer automatically initializes its tap coefficients to values. During an initialization process, a linear search algorithm is performed that sweeps the tap coefficients through different combinations of tap coefficients while assessing information about an eye associated with an input signal received over a communications channel. When the eye information indicates that the eye is open, the current tap coefficients are selected as the initial tap coefficients to be used at the beginning of the main adaptation algorithm.

26 Claims, 8 Drawing Sheets

_US 9,020,024 B1_

RATE-ADAPTIVE EQUALIZER THAT AUTOMATICALLY INITIALIZES ITSELF BASED ON DETECTED CHANNEL CONDITIONS, AND A METHOD

TECHNICAL FIELD OF THE INVENTION

The invention relates to equalizers, and more particularly, to an adaptive equalizer that automatically initializes itself.

BACKGROUND OF THE INVENTION

An equalizer is an electronic device that attempts to reverse distortion incurred when a signal is transmitted through a channel. In digital communications, an equalizer promotes reduction of inter-symbol interference. Distortion occurs because a channel's frequency response is not perfectly linear. If an equalizer's transfer function is the inverse of the channel's transfer function within the frequency range of the transmitted information, the equalizer can provide a flat response. The transfer function of an equalizer is commonly defined by circuitry having a number of nodes or taps that correspond to coefficients of the transfer function. Each tap has one or more controls, such as gain and dither. Setting the gain, dither or other tap controls establishes the transfer function.

In some equalizers, the tap controls or settings are fixed or hard-wired into the circuitry. In other equalizers, a user can program these settings. In still other equalizers, known as adaptive equalizers, tap control signals are generated in response to inputs that can vary. For example, an adaptive equalizer can vary the tap control signals in response to mean squared error (MSE) in a feedback-based manner. MSE is a measure of the difference between the transmitted data and the equalizer output (i.e., the equalized signal). An adaptive equalizer attempts to determine the set or group of tap settings that results in the least MSE, i.e., minimization of the MSE. Some adaptive equalizers perform such a process during a training sequence in preparation for data transmission. Other adaptive equalizers perform such a process dynamically during the data transmission. The latter type of adaptive equalizer may perform an iterative process that converges to a solution that minimizes the MSE.

Adaptive equalizer circuitry can include Decision Feedback Equalizer (DFE) circuitry, Feedforward Equalizer (FFE) circuitry, continuous-time linear equalizer (CTLE) circuitry, or a combination of one or more of these. Some adaptive equalizers are capable of adapting to changes in the data rate of the signal being transmitted over the channel. Such adaptive equalizers are known as rate-adaptive equalizers. One type of rate-adaptive equalizer uses programmable delay cells to adjust the delay of the equalizer based on the change in the data rate. Such rate-adaptive equalizers are limited in terms of dynamic range, precision and power consumption. Another type of rate-adaptive equalizer uses a clock-and-data recovery (CDR) circuit to lock onto the frequency of the data signal to recover a clock rate and then controls clocked delay elements (i.e. flip flops) of the equalizer in accordance with the recovered clock rate.

Rate-adaptive equalizers that use CDRs in this manner are more precise and power-efficient than those that use programmable delay cells. CDR-based rate-adaptive equalizers, however, have limitations in terms of initializing the tap settings, i.e., the coefficients of the transfer functions of the FFE/CTLE and the DFE of the equalizer. The equalizer needs to equalize the input data stream in order to allow the CDR to lock onto the incoming data frequency. If the CDR is not locked, the operation of the clocked delay cells will not be optimal and will therefore lead to errors. The equalizer, however, cannot properly perform equalization without the CDR being locked to the incoming data frequency. This presents somewhat of a problem when it comes to initializing the tap settings.

One solution to overcoming this problem is to have a user manually enter the initial tap settings. This is typically accomplished by a user who enters the initial tap settings into a register file of an IC digital interface such as $I^2C$ to the system controller IC. In order to choose the correct initial tap settings, however, the user must have certain knowledge about the communication channel, which the user may not possess. To further complicate matters, channel conditions may change over time, which would require a change to the initial tap settings. A customer who purchases equipment containing the equalizer may not have sufficient knowledge to correctly choose the tap settings.

Accordingly, a need exists for a rate-adaptive equalizer that is capable of self-initialization, thereby eliminating the need for a user to be involved in initializing the equalizer with the correct tap settings.

SUMMARY OF THE INVENTION

The invention provides a rate-adaptive equalizer and method. In accordance with an illustrative embodiment, the rate-adaptive equalizer comprises equalizer circuitry, CDR circuitry, and adaptive control logic. The equalizer circuitry has a plurality of clocked delay elements, each having tap coefficients that can be varied to vary a delay provided by the clocked delay elements. The tap coefficients are applied to taps of the clocked delay elements. The equalizer circuitry receives an input signal and outputs at least a first equalizer output signal. The CDR circuitry is electrically coupled to the equalizer circuitry and receives the equalizer output signal. The CDR circuitry recovers a clock signal from the received equalizer output signal and outputs the clock signal and a frequency lock signal, F_LOCK. The clock signal is delivered to the clocked delay elements. The adaptive control logic is configured to provide at least one control signal to the equalizer circuitry to select values of the tap coefficients being applied to the taps. The adaptive control logic is also configured to perform an initialization algorithm that generates different combinations of tap coefficients and causes the combinations of tap coefficients to be applied to the clocked delay elements while evaluating information relating to an eye associated with the input signal to determine which combination of tap coefficients results in a highest quality eye. The adaptive control logic designates the combination of tap coefficients resulting in the highest quality eye as initial coefficients to be applied to the taps.

In accordance with another illustrative embodiment, the rate-adaptive equalizer comprises equalizer circuitry, CDR circuitry, mean squared error (MSE) circuitry, eye monitor circuitry, and adaptive control logic. The equalizer circuitry has a plurality of clocked delay elements, each having tap coefficients that can be varied to vary a delay provided by the clocked delay elements. The tap coefficients are applied to taps of the clocked delay elements. The equalizer circuitry receives an input signal and outputs at least a first equalizer output signal. The CDR circuitry is electrically coupled to the equalizer circuitry and receives the equalizer output signal. The CDR circuitry recovers a clock signal from the received equalizer output signal and outputs the clock signal and a frequency lock signal, F_LOCK. The clock signal is delivered to the clocked delay elements. The MSE circuitry is electrically coupled to the equalizer circuitry and to the adaptive control logic. The MSE circuitry processes at least a second equalizer output signal outputted from the equalizer circuitry and generates an MSE output signal that represents an estimate of the mean squared error of the second equalizer output signal. A digitized version of the MSE output signal is received in the adaptive control logic. The eye monitor circuitry is electrically coupled to the equalizer circuitry and to the adaptive control logic. The eye monitor circuitry processes the first equalizer output signal and generates one or more eye monitor output signals representing one or more eye characteristics.

The adaptive control logic is configured to perform an initialization algorithm that generates different combinations of tap coefficients and causes the combinations of tap coefficients to be applied to the clocked delay elements while evaluating information relating to an eye associated with the input signal to determine which combination of tap coefficients results in a highest quality eye. The adaptive control logic designates the combination of tap coefficients resulting in the highest quality eye as initial coefficients to be applied to the taps. In accordance with this illustrative embodiment, the information relating to the eye is based on at least one of the F_LOCK signal, the one or more eye monitor output signals, and the estimate of the mean squared error represented by the MSE output signal.

The method comprises the following:

in clock-and-data recovery (CDR) circuitry of the equalizer, receiving an equalizer output signal and recovering a clock signal from the received equalizer output signal;

outputting the clock signal and a frequency lock signal, F_LOCK, from the CDR circuitry;

in equalizer circuitry of the equalizer, receiving an input signal to be equalized and the clock signal output from the CDR circuitry;

passing the received input signal through a plurality of delay elements that are clocked by the received clock signal, where the clocked delay elements having tap coefficients that can be varied to vary a delay provided by the clocked delay elements;

outputting at least a first equalizer output signal from the equalizer circuitry;

in adaptive control logic of the equalizer, providing at least one control signal to the equalizer circuitry to select values of the tap coefficients being applied to the taps;

in the adaptive control logic, performing an initialization algorithm that generates different combinations of tap coefficients and causes the combinations of tap coefficients to be applied to the clocked delay elements while evaluating information relating to an eye associated with the input signal to determine which combination of tap coefficients results in a highest quality eye; and in the adaptive control logic, designating the combination of tap coefficients resulting in the highest quality eye as initial coefficients to be applied to the taps.

These and other features and advantages of the invention will become apparent from the following description, drawings and claims.

DETAILED DESCRIPTION OF AN
ILLUSTRATIVE EMBODIMENT

In accordance with embodiments described herein, a rate-adaptive equalizer is provided that automatically initializes its tap coefficients to values that should allow the CRD to achieve frequency lock. During an initialization process, a linear search algorithm is performed that generates different combinations of the tap coefficients and applies them to the taps while evaluating information relating to an eye associated with an input signal received at the input of the equalizer. As is well known in the art, the eye opening provides information about ISI and noise on the communications channel and is used to ascertain the integrity of the received input signal. After all of the different combinations of tap coefficients have been applied to the taps, the set of tap coefficients that resulted in the best eye opening is designated as the initial set of tap coefficients to be applied to the taps as the beginning state of the equalizer. The main, or post-initialization, equalization adaptation algorithm is then enabled to allow the equalizer to adaptively fine tune the tap coefficients in the known manner to their convergence values. If the rate of the incoming data signal subsequently changes, the equalizer will again perform the initialization process to automatically initialize the tap coefficients. In this way, the need for user intervention in order to initialize the tap coefficients is eliminated.

Figure 1:
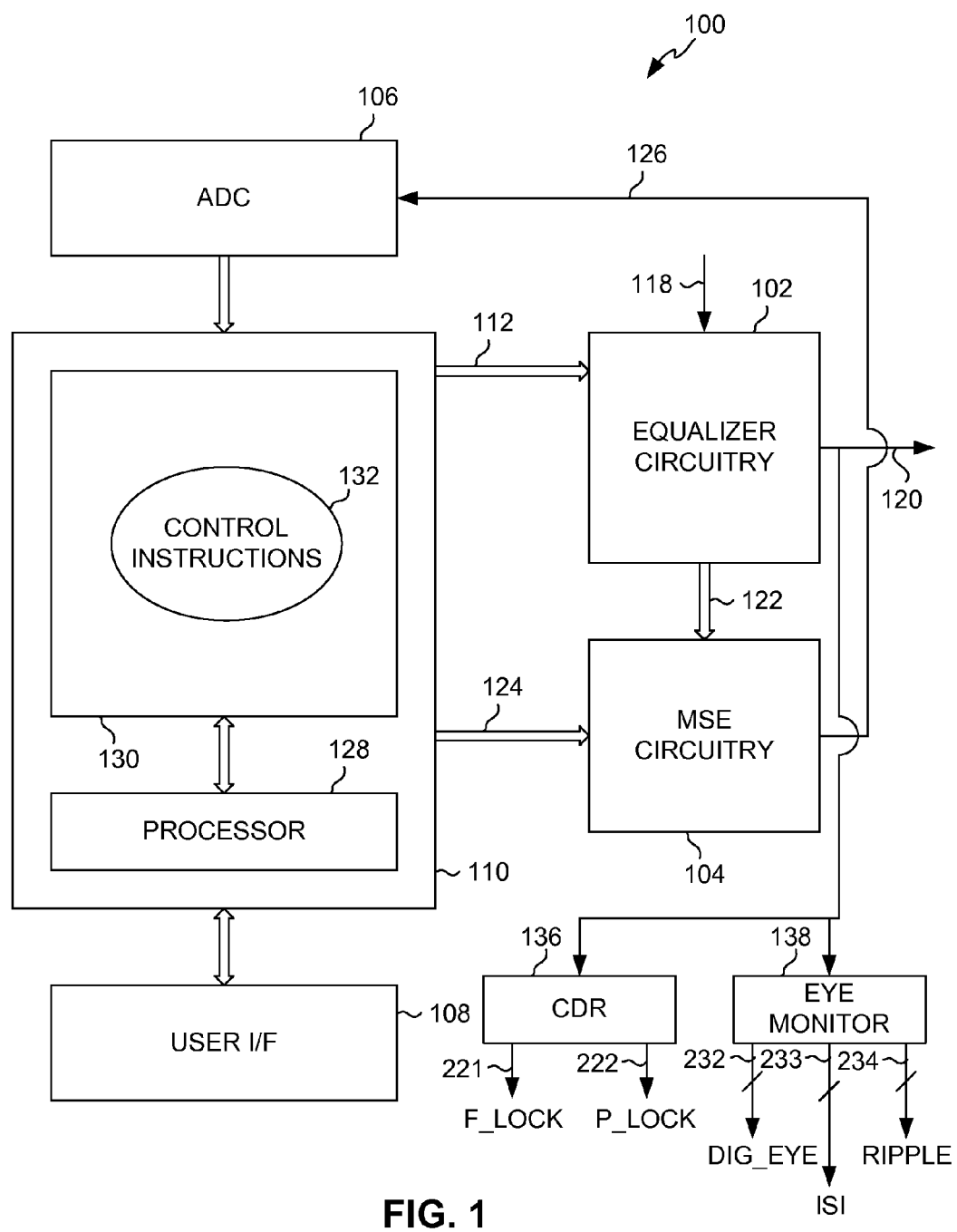
FIG. 1 illustrates a block diagram of the adaptive equalizer in accordance with an illustrative embodiment.

As illustrated in FIG. 1, in accordance with an illustrative or exemplary embodiment of the invention, a rate-adaptive adaptive equalizer 100 includes equalizer circuitry 102, mean squared error (MSE) circuitry 104, analog-to-digital conversion (ADC) circuitry 106, user interface circuitry 108, adaptive control logic 110, CDR circuitry 136, and eye monitor circuitry 138. Equalizer circuitry 102 can be of a type that is well known to persons skilled in the art and includes a combination of Decision Feedback Equalizer (DFE) aspects, Feedforward Equalizer (FFE) aspects, and continuous-time linear equalizer (CTLE) aspects. Equalizer circuitry 102 receives tap control signals 112 from adaptive control logic 110. The tap control signals 112 set the tap coefficients of the DFE 142 and FFE 144, which correspond to the coefficients of the transfer functions of the DFE 142 and FFE 144. Equalizer circuitry 102 typically also receives other control signals from adaptive control logic 110, such as signals to enable or disable taps, but such other control signals are not shown for purposes of clarity. Equalizer circuitry 102 receives an input signal 118 to be equalized. In response to inputs that include tap control signals 112, equalizer circuitry 102 applies equalization to input signal 118 to produce an equalized signal 120.

Figure 2:
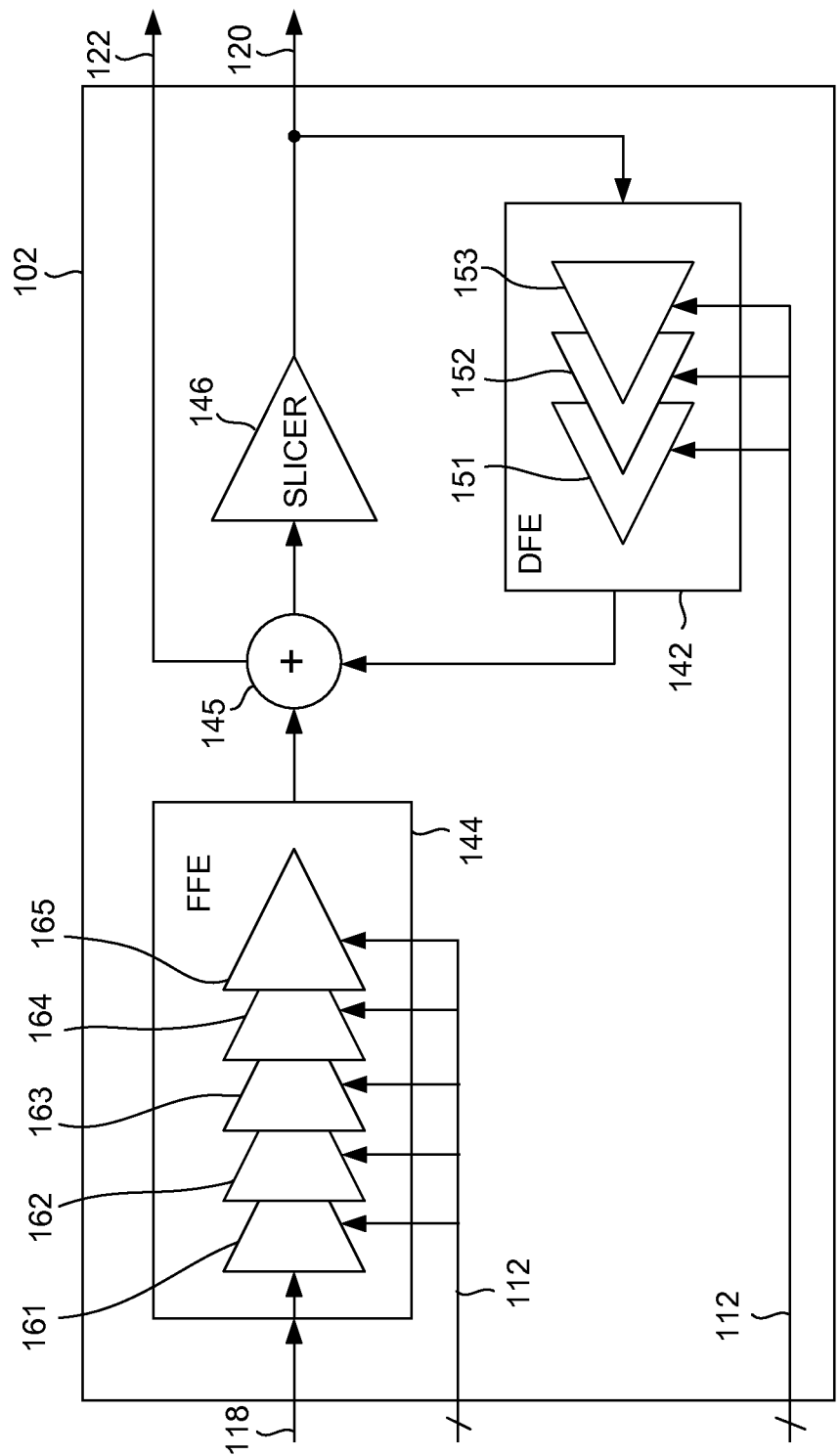
FIG. 2 illustrates a block diagram of the equalizer circuitry shown in FIG. 1 in accordance with one illustrative embodiment.

As illustrated in FIG. 2, suitable equalizer circuitry 102 can comprise DFE circuitry 142, FFE circuitry 144, a summing node 145, and a slicer 146. The DFE circuitry 142 comprises a plurality of taps 151, 152, 153, etc., each controlled by one of tap control signals 112. Similarly, FFE circuitry 144 comprises a plurality of taps 161, 162, 163, 164, 165, etc., each controlled by one of tap control signals 112. Thus, some of the taps of equalizer circuitry 102 set the tap coefficients of the DFE circuitry 142, while other taps of equalizer circuitry 102 set the tap coefficients of the FFE circuitry 144. The triangles shown in the FFE and DFE circuitry 144 and 142 represent clocked delay elements that receive clock signals that are based on the clock recovered by the CDR circuitry 136 shown in FIG. 1. For ease of illustration, the clock signals received by the DFE and FFE circuitry 142 and 144 are not shown. Input signal 118 is provided to inputs of both the DFE circuitry 142 and the FFE circuitry 144. Summing node 145 sums the outputs of the DFE circuitry 142 and the FFE circuitry 144 and provides the result or sum to slicer 146. The output of slicer 146 defines the above-referenced equalized signal 120. High-speed equalized output signal 122 is the output of adder 145 and is provided to the MSE block 104 as shown in 100.

Figure 3:
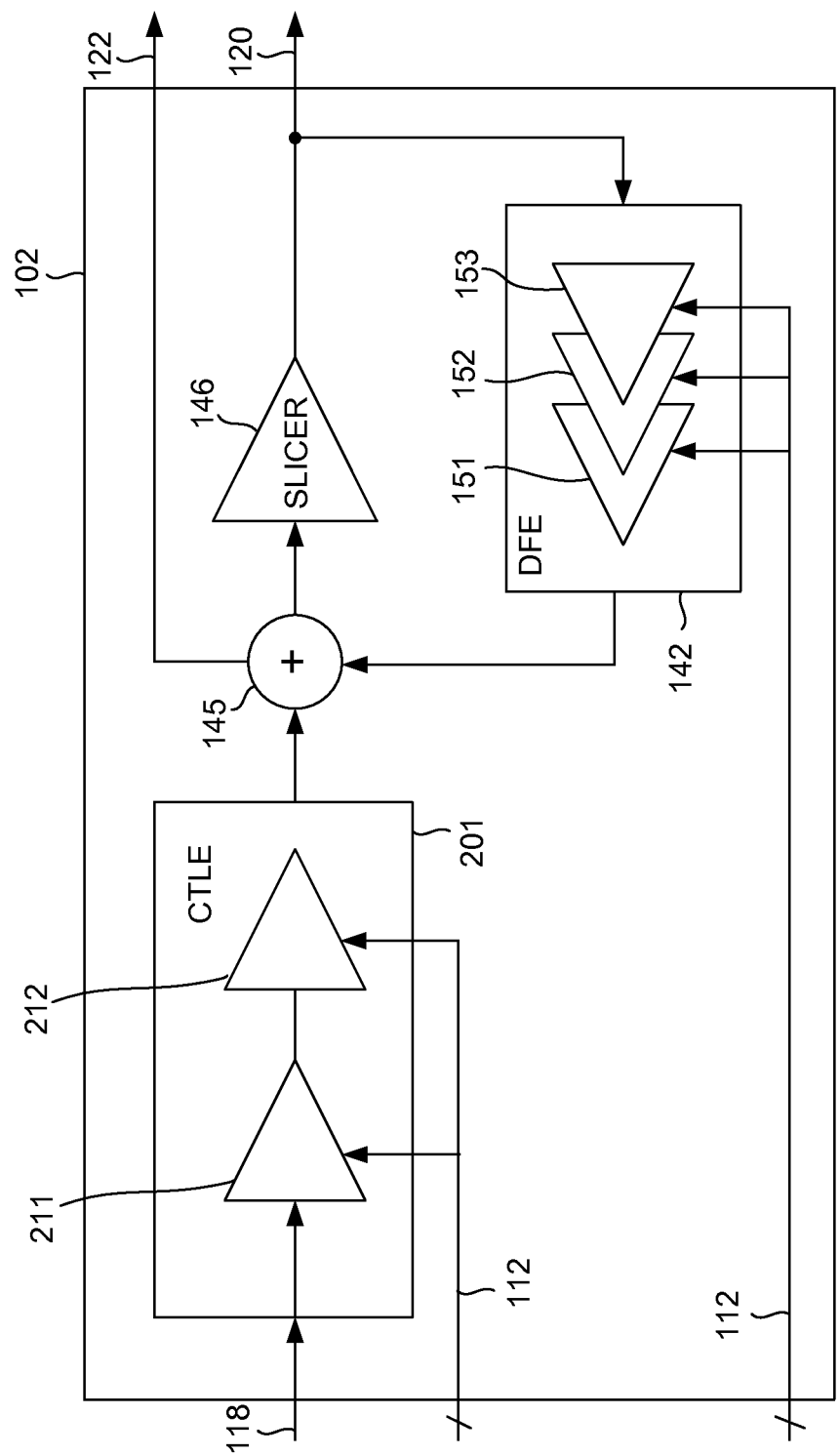
FIG. 3 illustrates a block diagram of the equalizer circuitry shown in FIG. 1 in accordance with another illustrative embodiment.

As illustrated in FIG. 3, suitable equalizer circuitry 102 can comprise DFE circuitry 142, CTLE circuitry 201, a summing node 145, and a slicer 146. The DFE circuitry 142 comprises a plurality of taps 151, 152, 153, etc., each controlled by one of tap control signals 112. Similarly, CTLE circuitry 201 comprises a plurality of taps 211, 212, etc., each controlled by one of tap control signals 112. Thus, some of the taps of equalizer circuitry 102 set the tap coefficients of the DFE 142, while other taps of equalizer circuitry 102 set the tap coefficients of the CTLE circuitry 201. The triangles shown in the CTLE circuitry 201 represent clocked delay elements that receive clock signals that are based on the clock recovered by the CDR circuitry 136 shown in FIG. 1. For ease of illustration, the clock signals received by the CTLE circuitry 201 are not shown. Input signal 118 is provided to inputs of both the DFE circuitry 142 and the CTLE circuitry 201. Summing node 145 sums the outputs of the DFE circuitry 142 and the CTLE circuitry 201 and provides the result or sum to slicer 146. The output of slicer 146 defines the above-referenced equalized signal 120. High-speed equalized output signal 122 is the output of adder 145 and is provided to the MSE block 104 as shown in 100.

Figure 4:
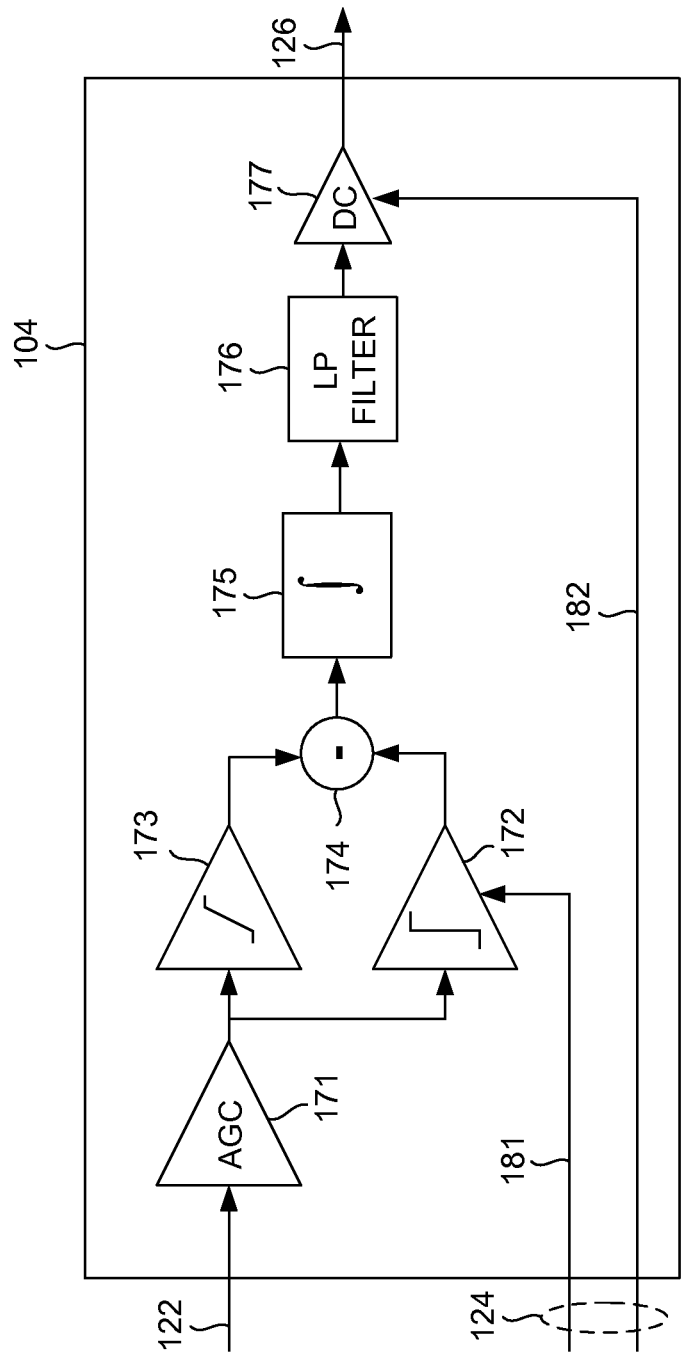
FIG. 4 illustrates a block diagram of the MSE circuitry of FIG. 1 in accordance with an illustrative embodiment.

MSE circuitry 104 receives the high-speed equalized output signal 122 from equalizer circuitry 102 and receives control signals 124 from adaptive control logic 110. As illustrated in FIG. 4, suitable MSE circuitry 104 includes automatic gain control (AGC) 171, a limiter 172, a linear unity gain stage 173, and a high speed subtractor 174. The AGC 171 receives the high-speed equalized output signal 122. Control signals 124 include a swing control signal 181 that controls limiter 172. The output of AGC 171 is provided to both limiter 172 and linear unity gain stage 173. Subtractor 174 subtracts the output of limiter 172 (i.e., a limited-path signal) from the output of linear unity gain stage 173. The MSE circuitry 104 also includes an integrator 175, a low-pass filter 176, and a variable DC amplifier 177. The integrator 175 receives the output of subtractor 174. Low-pass filter 176 receives the output of integrator 175. Variable DC amplifier 177 receives the output of low-pass filter 176. Control signals 124 include a DC gain control signal 182 that controls the gain of variable DC amplifier 177. The output of variable DC amplifier 177 defines the above-referenced analog MSE output signal 126.

In response to signals 122 and 124, MSE circuitry 104 produces an MSE output signal 126 that represents an estimate of the mean squared error of the equalized signal 120. As persons of skill in the art are familiar with the structure and operation of equalizer circuitry 102, such aspects are not shown or described in further detail. ADC circuitry 106 converts the analog MSE output signal 126 into a digital signal and provides the digital signal to adaptive control logic 110.

The adaptive control logic 110 also receives a frequency lock signal, F_LOCK, 221 and a phase lock signal, P_LOCK, 222 from the CDR circuit 136. In addition, the adaptive control logic 110 receives a multi-bit digital eye signal, DIG_EYE, 232 a multi-bit ISI signal, ISI, 233 and a multi-bit ripple signal, RIPPLE, 234 from the eye monitor circuitry 138. The manner in which the adaptive control logic 110 uses one or more of these different signals is described below in detail.

User interface circuitry 108 can include suitable digital bus control logic, such as, for example, I²C, as well as user interface devices such as a keyboard, display, etc. (not shown). User interface circuitry 108 allows a user to determine conditions in adaptive equalizer 100 and to set parameters and programmable values in adaptive equalizer 100.

Adaptive control logic 110 includes a processor 128 and memory 130. Other elements of adaptive control logic 110, such as configuration registers and interface logic, are not shown for purposes of clarity. Adaptive control logic 110 operates in response to software or instructions 132 that are executed by processor 128. Instructions 132 correspond to the methods described below. In view of the methods described below, persons skilled in the art are capable of providing suitable instructions 132 and programming or otherwise configuring adaptive control logic 110 to effect the methods. In accordance with conventional computing principles, the execution of instructions 132 by processor 128 can be considered to give rise to logic that is configured to effect the methods described below. In this sense, adaptive control logic 110 comprises logic configured to effect the methods.

It should also be noted that the combination of memory 130 and instructions 132 defines a "computer program product" as that term is understood in the patent lexicon. Although in the exemplary embodiment adaptive control logic 110 comprises processor 128 and memory 130, in other embodiments (not shown) such adaptive control logic can comprise any other suitable elements defined by any suitable combination of hardware, software, firmware, etc. Although instructions 132 are conceptually shown as stored in or residing in memory 130 for purposes of illustration, persons skilled in the art understand that instructions 132 may not be stored or reside in their entirety within memory 130 but rather may be retrieved in portions on an as-needed basis from other sources (not shown) such as firmware or read-only memory for execution by processor 128 in accordance with conventional computing principles.

In accordance with illustrative embodiments of the invention, the adaptive control logic 110 performs a linear search algorithm as part of the initialization algorithm. The initialization algorithm processes one or more of the signals received from the MSE circuitry 104, the CDR circuitry 136 and/or the eye monitor circuitry 138 while the linear search algorithm sweeps through different combinations of tap coefficients for the FFE 144 or CTLE 210 and for the DFE 142. As the linear search algorithm sweeps through different combinations of the tap coefficients and applies them to the taps 151-153 and 161-165 (FIG. 2) or to taps 151-153 and 211-112 (FIG. 3), the adaptive control logic 110 evaluates one or more of the MSE output signal 126, the F_LOCK signal 221, the DIG_EYE signal 232, the ISI signal 233, and the RIPPLE signal 234 to determine the quality of the eye for each combination. Based on this eye information, the adaptation control logic 110 determines which combination of tap coefficients resulted in the best eye opening. The adaptive control logic 110 then designates the corresponding tap coefficients to be used as the initial values during the main, post-initialization, equalization adaptation algorithm. The adaptive control logic 110 then enables, or hands off control to, the main equalization adaptation algorithm to allow the equalizer to adaptively fine tune the tap coefficients in the known manner from the initial values to the convergence values.

A generalized programmable step and direction linear search algorithm is utilized in this invention to facilitate fast convergence and reduce the effects of noise to the initialization sequence. Because linear search algorithms are well known, the manner in which the linear search algorithm is performed will not be described herein in detail. Each tap is controlled by a control signal made up of a particular number of control bits. For example, the DFE circuitry 142 has three taps controlled by three respective control signals. Each of these control signals may be made up of, for example, five bits. In this example, there are $2^5=32$ possible combinations of coefficients for each of taps 151-153. The linear search algorithm will apply every possible combination of coefficients by linearly stepping each five-bit number from 0 to 31 or from 31 to 0, respectively, in steps on each clock cycle for each of the taps 151-153. The same will happen for the taps of the FFE circuitry 144 or the CTLE circuitry 201. As the different combinations of tap coefficients are applied to the taps, the linear search algorithm obtains the corresponding eye information and associates the corresponding eye information with the corresponding combination of tap coefficients, e.g., by storing them together in memory 130. The amount of time that is required to perform the search is relatively short, e.g., on the order of a microsecond. The amount of time that is required can be reduced by not using the least significant bits of the control signals. For example, in the case where each control signal is made up of five bits, not using the two least significant bits of each control signal will cause each three-bit control signal to increment, or step, by four on each clock cycle when incrementing from 0 to 31, as opposed to incrementing, or stepping, by 1 on each clock cycle if all five bits were used.

Figure 5:
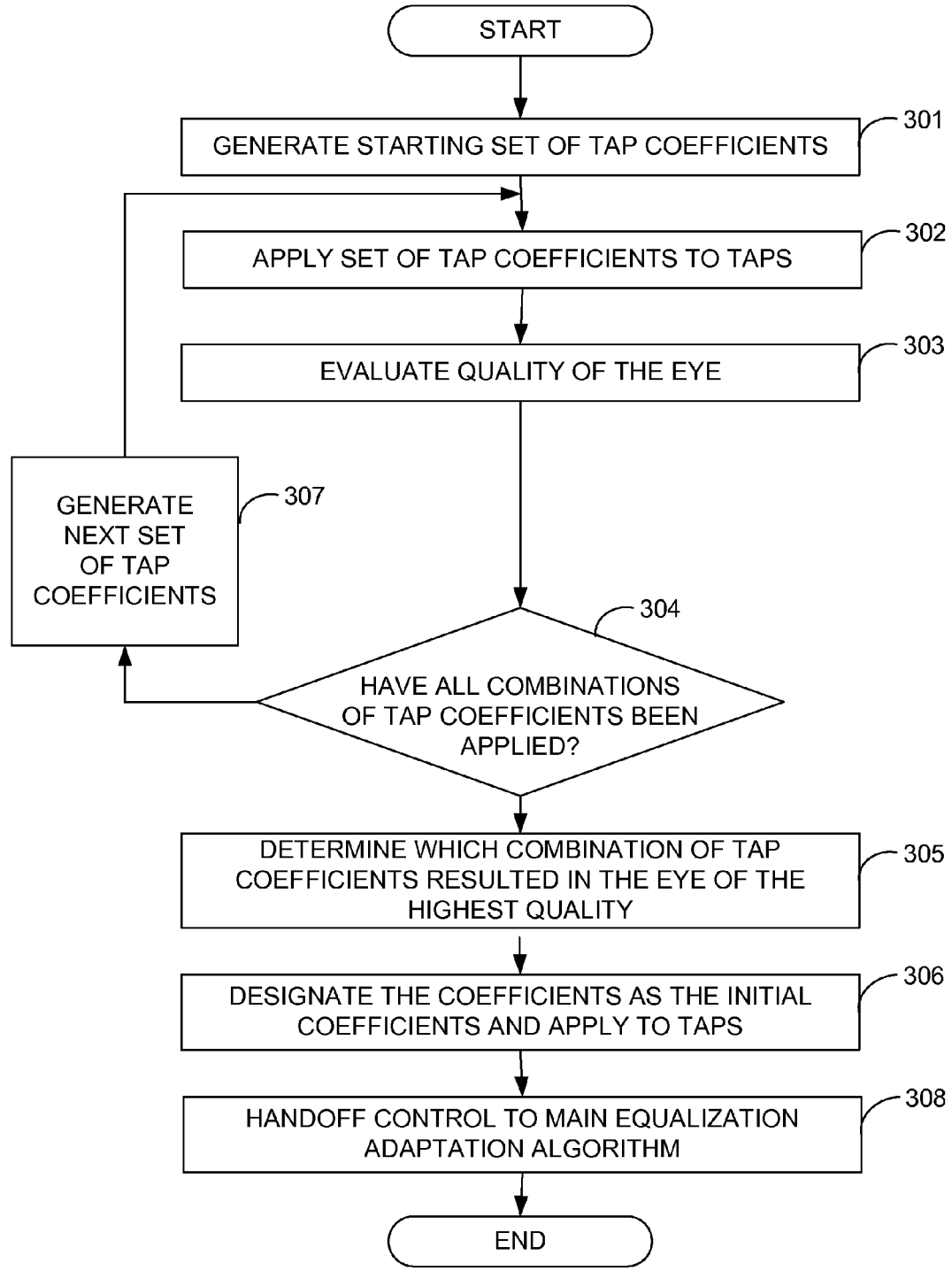
FIG. 5 illustrates a flow diagram that represents the method performed by the adaptive control logic shown in FIG. 1 in accordance with an illustrative embodiment to automatically initialize the equalizer circuitry shown in FIGS. 2 and 3.

FIG. 5 is a flow diagram that represents the method performed by the adaptive control logic 110 in accordance with an illustrative embodiment to automatically initialize the equalizer circuitry 102. At the start of the algorithm, a starting set of tap coefficients is generated, as indicated by block 301. Because the linear search algorithm sweeps through all possible combinations of tap coefficients, it does not matter what values are used for the starting set of tap coefficients. The set of tap coefficients is applied to the taps of the FFE or CTLE circuitry 144 or 201 and the DFE circuitry 142, as indicated by block 302. With the tap coefficients applied, information about the eye is evaluated to determine the quality of the eye, as indicated by block 303. As described above, the adaptive control logic evaluates one or more of the MSE output signal 126, the F_LOCK signal 221, the DIG_EYE signal 232, the ISI signal 233, and the RIPPLE signal 234 to determine the quality of the eye for each combination. The quality of the eye and the corresponding tap coefficients are typically stored in memory 130.

A determination is made as to whether all possible combinations of tap coefficients have been applied, as indicated by block 304. If so, then a determination is made as to which set of tap coefficients resulted in the eye of the highest quality, as indicated by block 305. The eye of the highest quality is typically the eye that is the most open, but other eye characteristics may be taken into consideration, such as the number of hits inside of the eye, for example. The corresponding tap coefficients are then designated as the initial tap coefficients and are applied to the respective taps, as indicated by block 306.

If it is determined at block 304 that all possible combinations of tap coefficients have not yet been applied, then the next combination of tap coefficients is generated, as indicated by block 307. The algorithm then returns to block 302. The process continues until the initial tap coefficients have been selected and applied at block 306. After the initial tap coefficients have been designated and applied, control is handed off to the main equalization adaptation algorithm to allow the equalizer to adaptively fine tune the tap coefficients in the known manner from the initially selected values to the convergence values, as indicated by block 308. Because the main, or post-initialization, equalization adaptation algorithms are well known and can vary widely, the manner in which the main equalization adaptation algorithm is performed will not be described herein in the interest of brevity.

Figure 6:
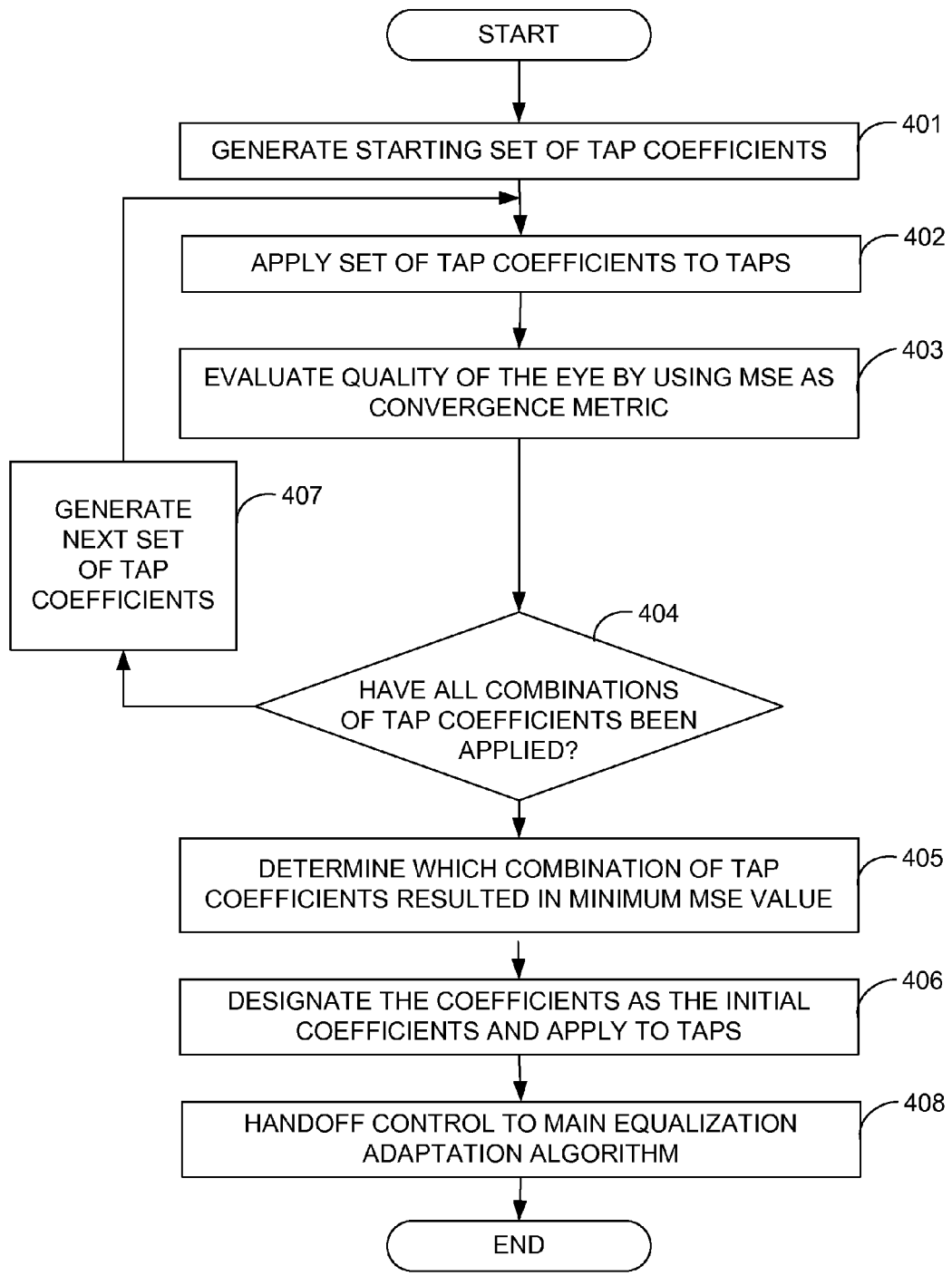
FIG. 6 illustrates a flow diagram that represents the method performed by the adaptive control logic shown in FIG. 1 in accordance with another illustrative embodiment to automatically initialize the equalizer circuitry shown in FIGS. 2 and 3.

FIG. 6 is a flow diagram that represents the method performed by the adaptive control logic 110 in accordance with an illustrative embodiment to automatically initialize the equalizer circuitry 102. At the start of the algorithm, a starting set of tap coefficients is generated, as indicated by block 401. The set of tap coefficients is applied to the taps of the FFE or CTLE circuitry 144 or 201 and the DFE circuitry 142, as indicated by block 402. With the tap coefficients applied, the minimum MSE is used as a convergence metric to evaluate the quality of the eye, as indicated by block 403. As described above, the adaptive control logic 110 evaluates the MSE output signal 126 to determine the MSE value associated with the applied coefficients. The MSE value and the corresponding tap coefficients are typically stored in memory 130.

A determination is made as to whether all possible combinations of tap coefficients have been applied, as indicated by block 404. If so, then a determination is made as to which set of tap coefficients resulted in the minimum MSE value, as indicated by block 405. The corresponding tap coefficients are then designated as the initial tap coefficients and are applied to the respective taps, as indicated by block 406.

If it is determined at block 404 that all possible combinations of tap coefficients have not yet been applied, then the next combination of tap coefficients is generated, as indicated by block 407. The algorithm then returns to block 402. The process continues until the initial tap coefficients have been designated and applied at block 406. After the initial tap coefficients have been designated and applied, control is handed off to the main equalization adaptation algorithm to allow the equalizer to adaptively fine tune the tap coefficients in the known manner from the initially selected values to the convergence values, as indicated by block 408.

Figure 7:
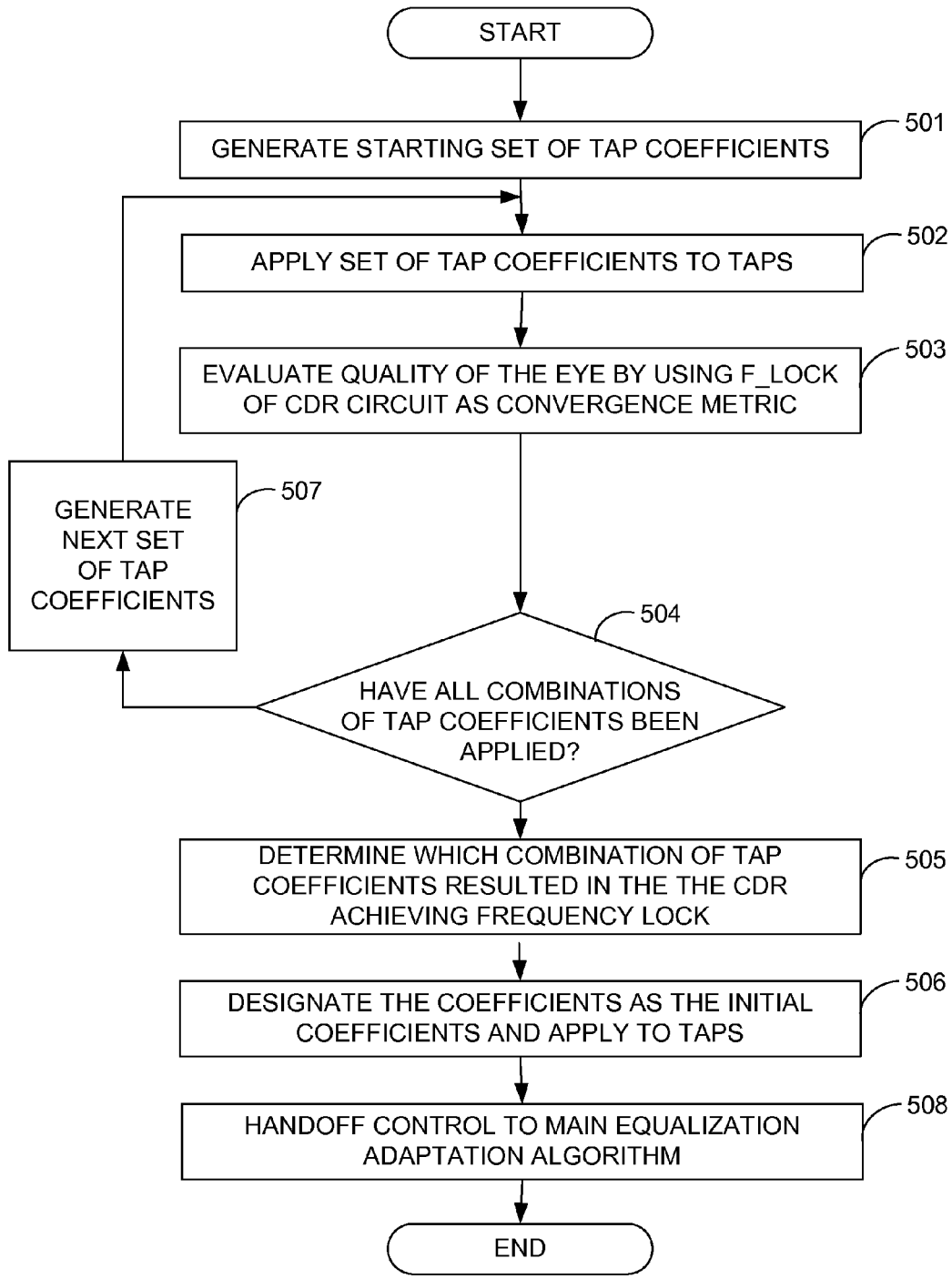
FIG. 7 illustrates a flow diagram that represents the method performed by the adaptive control logic shown in FIG. 1 in accordance with another illustrative embodiment to automatically initialize the equalizer circuitry shown in FIGS. 2 and 3.

FIG. 7 is a flow diagram that represents the method performed by the adaptive control logic 110 in accordance with an illustrative embodiment to automatically initialize the equalizer circuitry 102. At the start of the algorithm, a starting set of tap coefficients is generated, as indicated by block 501. The set of tap coefficients is applied to the taps of the FFE or CTLE circuitry 144 or 201 and the DFE circuitry 142, as indicated by block 502. With the tap coefficients applied, the F_LOCK signal 221 output from the CDR circuit 136 is used as a convergence metric to evaluate the quality of the eye, as indicated by block 503. The adaptive control logic 110 evaluates the F_LOCK signal 221 to determine whether it is asserted or deasserted. If the F_LOCK signal 221 is asserted, this is an indication that frequency lock has been achieved. If the F_LOCK signal 221 is deasserted, this is an indication that frequency lock has not been achieved.

A determination is made as to whether all possible combinations of tap coefficients have been applied, as indicated by block 504. If so, then a determination is made as to which set of tap coefficients resulted in the F_LOCK signal being asserted, as indicated by block 505. The corresponding tap coefficients are then designated as the initial tap coefficients and are applied to the respective taps, as indicated by block 506.

If it is determined at block 504 that all possible combinations of tap coefficients have not yet been applied, then the next combination of tap coefficients is generated, as indicated by block 507. The algorithm then returns to block 402. The process continues until the initial tap coefficients have been designated and applied at block 506. After the initial tap coefficients have been designated and applied, control is handed off to the main equalization adaptation algorithm to allow the equalizer to adaptively fine tune the tap coefficients in the known manner from the initially selected values to the convergence values, as indicated by block 508.

Figure 8:
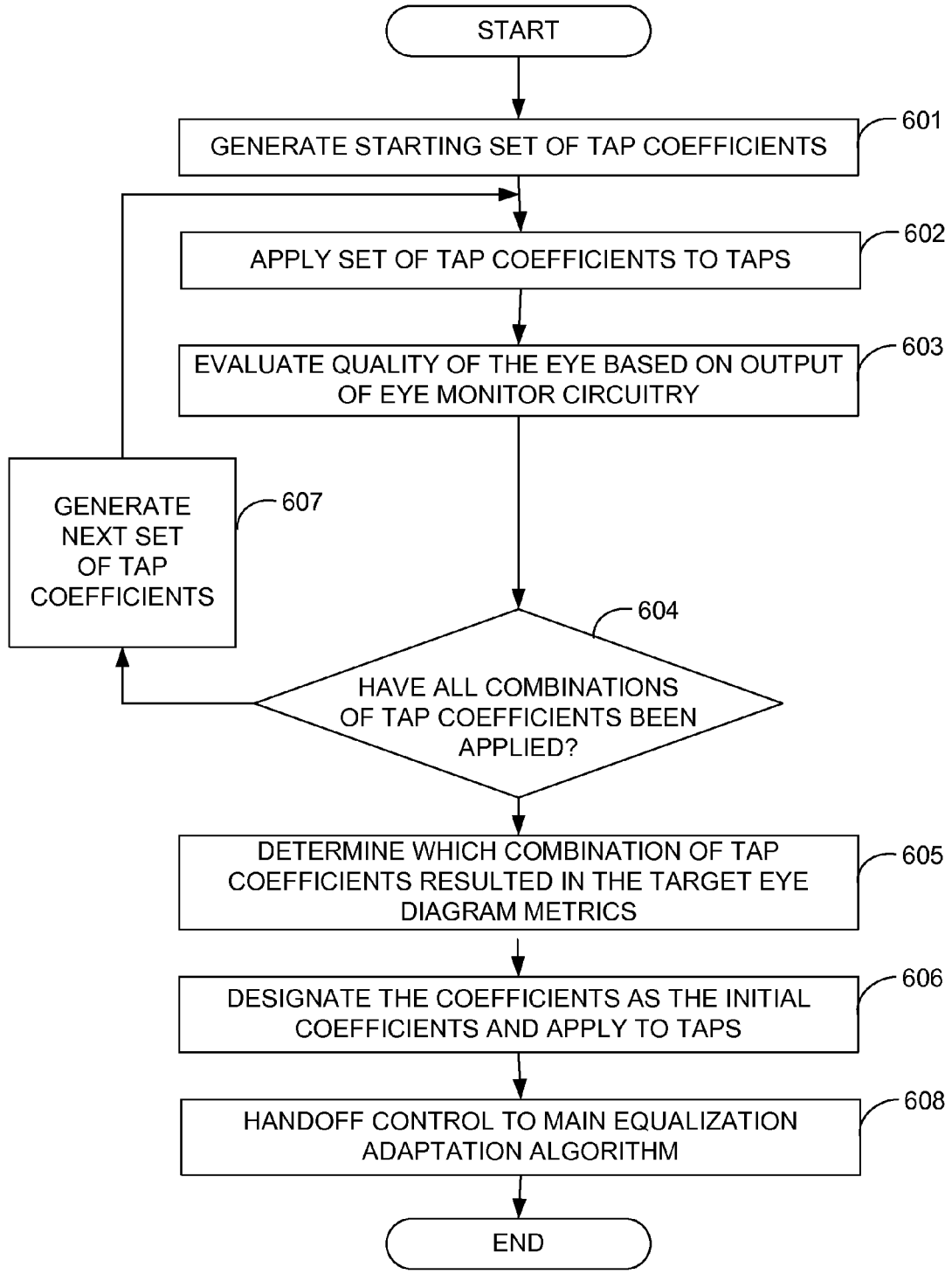
FIG. 8 illustrates a flow diagram that represents the method performed by the adaptive control logic shown in FIG. 1 in accordance with another illustrative embodiment to automatically initialize the equalizer circuitry shown in FIGS. 2 and 3.

FIG. 8 is a flow diagram that represents the method performed by the adaptive control logic 110 in accordance with an illustrative embodiment to automatically initialize the equalizer circuitry 102. At the start of the algorithm, a starting set of tap coefficients is generated, as indicated by block 601. The set of tap coefficients is applied to the taps of the FFE or CTLE circuitry 144 or 201 and the DFE circuitry 142, as indicated by block 602. With the tap coefficients applied, the output of the eye monitor circuitry 138 is used to evaluate the quality of the eye, as indicated by block 603. The adaptive control logic 110 evaluates one or more of the DIG_EYE signal 232, the ISI signal 233 and the RIPPLE signal 234 to determine various metrics of the eye. The eye metrics and the corresponding coefficients are stored in memory 130.

A determination is made as to whether all possible combinations of tap coefficients have been applied, as indicated by block 604. If so, then a determination is made as to which set of tap coefficients resulted in a target eye metric or set of metrics, as indicated by block 605. The corresponding tap coefficients are then designated as the initial tap coefficients and are applied to the respective taps, as indicated by block 606.

If it is determined at block 604 that all possible combinations of tap coefficients have not yet been applied, then the next combination of tap coefficients is generated, as indicated by block 607. The algorithm then returns to block 602. The process continues until the initial tap coefficients have been designated and applied at block 606. After the initial tap coefficients have been designated and applied, control is handed off to the main equalization adaptation algorithm to allow the equalizer to adaptively fine tune the tap coefficients in the known manner from the initially selected values to the convergence values, as indicated by block 608.

Aspects of the algorithms represented by the flow diagrams of FIGS. 6-8 may be combined to improve the robustness of the algorithm. For example, the steps represented by block 403, 503 and/or 603 of FIGS. 6, 7 and 8, respectively, can be combined to increase the types or amounts of information that is considered for each combination of coefficients being applied to the taps. Likewise, the steps represented by block 405, 505 and/or 605 of FIGS. 6, 7 and 8, respectively, can be combined to make the best determination as to which set of tap coefficients most likely corresponds to the best eye opening. For example, the set of coefficients corresponding to frequency lock by the CDR circuitry 136 and the set of coefficients corresponding to the minimum MSE value output from the MSE circuitry 104 may be evaluated together to determine which set of coefficients most likely corresponds to the best eye opening. Similarly, the set of coefficients corresponding to a targeted eye metric output from the eye monitor circuitry 138 and the set of coefficients corresponding to the minimum MSE value output from the MSE circuitry 104 may be evaluated together to determine which set of coefficients most likely corresponds to the best eye opening. Similarly, the set of coefficients corresponding to a targeted eye metric output from the eye monitor circuitry 138 and the set of coefficients corresponding to frequency lock by the CDR circuitry 136 may be evaluated together to determine which set of coefficients most likely corresponds to the best eye opening.

It should be noted that the configuration of the rate-adaptive equalizer 100 shown in FIG. 1 is merely one of many possible configurations that may be implemented as on-chip functionality, or in general, as off-chip processing blocks, such as a host micro controller, etc. Many variations for the equalizer can be achieved that are different from that shown in FIG. 1, and still fall within the scope of the invention. For example, the equalizer 100 need not include the eye monitor circuitry 138 to perform embodiments of the invention. Likewise, the equalizer 100 need not include the MSE circuitry 104 to perform embodiments of the invention. Also, equalizer circuitry 102 may have configurations other than those shown in FIGS. 2 and 3 and still fall within the scope of the invention. Likewise, MSE circuitry 104 may have configurations other than those shown in FIG. 4 and still fall within the scope of the invention. These configurations are merely examples of suitable configurations for performing the functions described above, and many other configurations are possible, as will be understood by persons of skill in the art in view of the description being provided herein.

It should be noted that the invention has been described with respect to illustrative embodiments for the purpose of describing the principles and concepts of the invention. The invention is not limited to these embodiments. As will be understood by those skilled in the art in view of the description being provided herein, the modifications described above and many others may be made to the illustrative embodiments described above to achieve the goals of the invention, and all such modifications are within the scope of the invention.

What is claimed is:

1. A rate-adaptive equalizer comprising:
equalizer circuitry having a plurality of clocked delay elements, the clocked delay elements having tap coefficients that can be varied to vary a delay provided by the clocked delay elements, the tap coefficients being applied to taps of the clocked delay elements, the equalizer circuitry receiving an input signal and outputting at least a first equalizer output signal;
clock-and-data recovery (CDR) circuitry, the CDR circuitry electrically coupled to the equalizer circuitry, the CDR circuitry receiving the equalizer output signal and recovering a clock signal from the received equalizer output signal, the CDR circuitry outputting the clock signal and a frequency lock signal, F_LOCK, the clock signal being delivered to the clocked delay elements; and adaptive control logic configured to provide at least one control signal to the equalizer circuitry to select values of the tap coefficients being applied to the taps of the equalizer circuitry, wherein the adaptive control logic is configured to perform an initialization algorithm that generates different combinations of tap coefficients and causes the combinations of tap coefficients to be applied to the clocked delay elements while evaluating information relating to an eye associated with the input signal to determine which combination of tap coefficients results in a highest quality eye, and wherein the adaptive control logic designates the combination of tap coefficients resulting in the highest quality eye as initial coefficients to be applied to the taps of the equalizer circuitry.

2. The rate-adaptive equalizer of claim 1, wherein the information that is evaluated relating to the eye includes the F_LOCK signal output by the CDR circuitry.

3. The rate-adaptive equalizer of claim 1, further comprising:

mean squared error (MSE) circuitry electrically coupled to the equalizer circuitry and to the adaptive control logic, the MSE circuitry processing at least a second equalizer output signal outputted from the equalizer circuitry and generating an MSE output signal that represents an estimate of the mean squared error of the second equalizer output signal, a digitized version of the MSE output signal being received in the adaptive control logic, and wherein the information that is evaluated by the adaptive control logic relating to the eye includes the estimate of the mean squared error represented by the MSE output signal.

4. The rate-adaptive equalizer of claim 3, wherein the information that is evaluated by the adaptive control logic relating to the eye includes the estimate of the mean squared error represented by the MSE output signal and the F_LOCK signal output by the CDR circuitry.

5. The rate-adaptive equalizer of claim 1, further comprising:

eye monitor circuitry electrically coupled to the equalizer circuitry and to the adaptive control logic, the eye monitor circuitry processing said at least a first equalizer output signal and generating one or more eye monitor output signals representing one or more eye characteristics, and wherein the information that is evaluated by the adaptive control logic relating to the eye includes said one or more eye characteristics represented by said one or more eye monitor output signals.

6. The rate-adaptive equalizer of claim 5, wherein the information that is evaluated by the adaptive control logic relating to the eye includes said one or more eye characteristics represented by said one or more eye monitor output signals and the F_LOCK signal output by the CDR circuitry.

7. The rate-adaptive equalizer of claim 1, wherein the initialization algorithm includes a linear search algorithm that periodically varies the tap coefficients by a particular step amount to generate the different combinations of tap coefficients such that all possible combinations of tap coefficients are applied to the clocked delay elements while evaluating information relating to an eye associated with the input signal to determine which combination of tap coefficients results in a highest quality eye.

8. The rate-adaptive equalizer of claim 7, wherein the step amount is at least 1.

9. The rate-adaptive equalizer of claim 8, wherein the step amount is at least 2.

10. The rate-adaptive equalizer of claim 9, wherein the step amount is at least 4.

11. The rate-adaptive equalizer of claim 7, wherein the step amount is selected by choosing a number of least significant bits of the tap coefficients being applied to each tap that are not to be used in generating the different combinations of tap coefficients.

12. The rate-adaptive equalizer of claim 1, further comprising:

mean squared error (MSE) circuitry electrically coupled to the equalizer circuitry and to the adaptive control logic, the MSE circuitry processing at least a second equalizer output signal outputted from the equalizer circuitry and generating an MSE output signal that represents an estimate of the mean squared error of the second equalizer output signal, a digitized version of the MSE output signal being received in the adaptive control logic; and eye monitor circuitry electrically coupled to the equalizer circuitry and to the adaptive control logic, the eye monitor circuitry processing said at least a first equalizer output signal and generating one or more eye monitor output signals representing one or more eye characteristics, and wherein the information that is evaluated by the adaptive control logic relating to the eye includes said one or more eye characteristics represented by said one or more eye monitor output signals and the estimate of the mean squared error represented by the MSE output signal.

13. The rate-adaptive equalizer of claim 12, wherein the information that is evaluated by the adaptive control logic relating to the eye further includes the F_LOCK signal output by the CDR circuitry.

14. A rate-adaptive equalizer comprising:

equalizer circuitry having a plurality of clocked delay elements, the clocked delay elements having tap coefficients that can be varied to vary a delay provided by the clocked delay elements, the tap coefficients being applied to taps of the clocked delay elements, the equalizer circuitry receiving an input signal and outputting at least a first equalizer output signal;

clock-and-data recovery (CDR) circuitry, the CDR circuitry electrically coupled to the equalizer circuitry, the CDR circuitry receiving the equalizer output signal and recovering a clock signal from the received equalizer output signal, the CDR circuitry outputting the clock signal and a frequency lock signal, F_LOCK, the clock signal being delivered to the clocked delay elements;

mean squared error (MSE) circuitry electrically coupled to the equalizer circuitry and to the adaptive control logic, the MSE circuitry processing at least a second equalizer output signal outputted from the equalizer circuitry and generating an MSE output signal that represents an estimate of the mean squared error of the second equalizer output signal, a digitized version of the MSE output signal being received in the adaptive control logic;

eye monitor circuitry electrically coupled to the equalizer circuitry and to the adaptive control logic, the eye monitor circuitry processing said at least a first equalizer output signal and generating one or more eye monitor output signals representing one or more eye characteristics; and adaptive control logic configured to provide at least one control signal to the equalizer circuitry to select values of the tap coefficients being applied to the taps, wherein the adaptive control logic is configured to perform an initialization algorithm that generates different combinations of tap coefficients and causes the combinations of tap coefficients to be applied to the clocked delay elements while evaluating information relating to an eye associated with the input signal to determine which combination of tap coefficients results in a highest quality eye, and wherein the adaptive control logic designates the combination of tap coefficients resulting in the highest quality eye as initial coefficients to be applied to the taps, and wherein the information relating to the eye is based on at least one of the F_LOCK signal, said one or more eye monitor output signals, and the estimate of the mean squared error represented by the MSE output signal.

15. A method for performing tap coefficient initialization in a rate-adaptive equalizer, the method comprising:
in clock-and-data recovery (CDR) circuitry of the equalizer, receiving an equalizer output signal and recovering a clock signal from the received equalizer output signal;
outputting the clock signal and a frequency lock signal, F_LOCK, from the CDR circuitry;
in equalizer circuitry of the equalizer, receiving an input signal to be equalized and the clock signal output from the CDR circuitry;
passing the received input signal through a plurality of delay elements of the equalizer circuitry that are clocked by the received clock signal, the clocked delay elements having tap coefficients that can be varied to vary a delay provided by the clocked delay elements, wherein the tap coefficients are applied to taps of the clocked delay elements;
outputting at least a first equalizer output signal from the equalizer circuitry, said at least a first equalizer output signal being received by the CDR circuitry;
in adaptive control logic of the equalizer, providing at least one control signal to the equalizer circuitry to select values of the tap coefficients being applied to the taps of the equalizer circuitry;
in the adaptive control logic, performing an initialization algorithm that generates different combinations of tap coefficients and causes the combinations of tap coefficients to be applied to the clocked delay elements while evaluating information relating to an eye associated with the input signal to determine which combination of tap coefficients results in a highest quality eye; and
in the adaptive control logic, designating the combination of tap coefficients resulting in the highest quality eye as initial coefficients to be applied to the taps of the equalizer circuitry.

16. The method of claim 15, wherein the information that is evaluated relating to the eye includes the F_LOCK signal output by the CDR circuitry.

17. The method of claim 15, further comprising:
in mean squared error (MSE) circuitry of the equalizer, processing at least a second equalizer output signal outputted from the equalizer circuitry and generating an MSE output signal that represents an estimate of the mean squared error of the second equalizer output signal; and
providing a digitized version of the MSE output signal to the adaptive control logic, and wherein the information that is evaluated by the adaptive control logic relating to the eye includes the estimate of the mean squared error represented by the MSE output signal.

18. The method of claim 17, wherein the information that is evaluated by the adaptive control logic relating to the eye includes the estimate of the mean squared error represented by the MSE output signal and the F_LOCK signal output by the CDR circuitry.

19. The method of claim 15, further comprising:
in eye monitor circuitry of the equalizer, processing said at least a first equalizer output signal and generating one or more eye monitor output signals representing one or more eye characteristics, and wherein the information that is evaluated by the adaptive control logic relating to the eye includes said one or more eye characteristics represented by said one or more eye monitor output signals.

20. The method of claim 19, wherein the information that is evaluated by the adaptive control logic relating to the eye includes said one or more eye characteristics represented by said one or more eye monitor output signals and the F_LOCK signal output by the CDR circuitry.

21. The method of claim 15, wherein the initialization algorithm includes a linear search algorithm that periodically varies the tap coefficients by a particular step amount to generate the different combinations of tap coefficients such that all possible combinations of tap coefficients are applied to the clocked delay elements while evaluating information relating to an eye associated with the input signal to determine which combination of tap coefficients results in a highest quality eye.

22. The method of claim 21, wherein the step amount is at least 1.

23. The method of claim 22, wherein the step amount is at least 2.

24. The method of claim 21, wherein the step amount is selected by choosing a number of least significant bits of the tap coefficients being applied to each tap that are not to be used in generating the different combinations of tap coefficients.

25. The method of claim 15, further comprising:
in mean squared error (MSE) circuitry electrically coupled to the equalizer circuitry and to the adaptive control logic, processing at least a second equalizer output signal outputted from the equalizer circuitry and generating an MSE output signal that represents an estimate of the mean squared error of the second equalizer output signal;
providing a digitized version of the MSE output signal to the adaptive control logic; and
in eye monitor circuitry electrically coupled to the equalizer circuitry and to the adaptive control logic, processing said at least a first equalizer output signal and generating one or more eye monitor output signals representing one or more eye characteristics, and wherein the information that is evaluated by the adaptive control logic relating to the eye includes said one or more eye characteristics represented by said one or more eye monitor output signals and the estimate of the mean squared error represented by the MSE output signal.

26. The method of claim 25, wherein the information that is evaluated by the adaptive control logic relating to the eye further includes the F_LOCK signal output by the CDR circuitry.

* * * * *